United States Patent [19]

Aoyama

[11] Patent Number: 5,295,295
[45] Date of Patent: Mar. 22, 1994

[54] APPARATUS FOR FEEDING AND TIGHTENING THREADED PARTS

[76] Inventor: Yoshitaka Aoyama, 20-11, Makitsukadai 2-cho, Sakai-shi, Osaka 590-01, Japan

[21] Appl. No.: 970,035

[22] Filed: Nov. 2, 1992

[30] Foreign Application Priority Data

Nov. 2, 1991 [JP] Japan .................................. 3-349379
Nov. 18, 1991 [JP] Japan .................................. 3-354183
Dec. 7, 1991 [JP] Japan .................................. 3-360771

[51] Int. Cl.$^5$ .......................... B23Q 7/10; B25B 23/02
[52] U.S. Cl. .................................... 29/813; 81/57.37; 81/431; 81/433
[58] Field of Search ................ 29/525.1, 809, 813; 81/57.37, 431, 432, 433, 435

[56] References Cited

U.S. PATENT DOCUMENTS 3,985,240 10/1976 Dixon .
4,815,343 3/1989 Sofinowski .

FOREIGN PATENT DOCUMENTS 0491484 6/1992 European Pat. Off. .
3934900 10/1989 Fed. Rep. of Germany .

OTHER PUBLICATIONS

Patent Abstracts of Japan, vol. 016, No. 325 (M–1280) Jul. 15, 1992 & JP-A-40 93 129.
Patent Abstracts of Japan, vol. 009, No. 172 (M–397) Jul. 17, 1985 & JP-A-60 044 237.
Patent Abstracts of Japan, vol. 014, No. 224 (M–972) May 11, 1990 & JP-A-20 56 306.

*Primary Examiner*—Timothy V. Eley
*Attorney, Agent, or Firm*—Pollock, Vande Sande & Priddy

[57] ABSTRACT

By advancing a rotatable feed rod (5) with a threaded part (1) such as a bolt or a nut inserted into a socket hole (6) at a front end thereof, the threaded part (1) is supplied and tightened to an object such as a threaded hole or a bolt. In order to prevent the part (1) from dropping off or dislocating on its way of feeding the part (1) is advanced to the vicinity of the object with the part being restrained by, for example, a closure member (31), and then the part (1) is inserted into the socket hole (6) of the feed rod (5). Finally, the feed rod (5) is further advanced until the part (1) arrives at the object and is tightened thereto.

7 Claims, 6 Drawing Sheets

APPARATUS FOR FEEDING AND TIGHTENING THREADED PARTS

BACKGROUND OF THE INVENTION

1. Field of the Invention

The present invention relates to feeding and tightening of threaded parts such as bolts and nuts to, depending on the parts, threaded holes or bolts (hereinafter called objects) at a desired location, with the purpose of realizing generally used bolt runners or nut runners as automatic machines.

2. Prior Art

As far as the present inventor investigated the literature there is no prior art exactly corresponding to the present invention, but generally a rotatable feed rod capable of reciprocating movement holds a threaded part at its front end, and carries the threaded part to the object by moving along a specified path while avoiding surrounding machines and devices. When the feed rod moves along such a specified path with the threaded part at its front end, the feed rod moves in the axial direction or then suddenly moves in a direction orthogonal to the axial direction, and therefore, the threaded part being held is caused to move suddenly or stop abruptly, and can be accidentally shaken off the front end of the feed rod or deviated in position due to the inertial force. Such problems as described are particularly significant in a robot apparatus of the like.

SUMMARY OF THE INVENTION

To solve the above problems, the invention provides a method for feeding and tightening a threaded part comprising the steps of positioning a holding member at a first position remote from a rotatable, reciprocating feed rod having a socket hole at a front end thereof for receiving a part, receiving and holding the part fed through a part feed passage by the holding member at the first position, restraining the part held by the holding member further by a restraining member, advancing the holding member and the feed rod toward an adjacent object with the part in a restrained state, and further advancing the feed rod, whereby the part reaches the object and is tightened thereto. According to the invention, the part is in a restrained state until reaching the vicinity of the object, and therefore, holding of the part is not disturbed by the inertial force. Besides, since the part is brought close to the object in the restrained state, the part will not be shaken off or deviated in position if the holding member may start quickly in any direction or stop abruptly, and therefore it is possible to operate normally without any trouble if applied in a robot or similar apparatus. Moreover, since the part restrained by the restraining member is brought into coaxial relationship with the feed rod, the part may be inserted very smoothly into the socket hold of the feed rod.

The timing of making the part and the feed rod coaxial with each other is specified. In either case, the part remains restrained by the restraining member until becoming coaxial with the feed rod, so that the part is held securely during this period.

In the invention the feed rod has a two-step stroke near the object so that the part is inserted into the socket hole of the feed rod in the first step while it is transferred and tightened to the object in the second step stroke. By the forwarding control of the feed rod alone, insertion transfer and tightening of the part are achieved.

In the invention, near the object, the part is inserted into the socket hole of the feed rod by withdrawing the holding member relative to the feed rod, and then the feed rod is advanced to transfer and tighten the part to the object. Since the feed rod has a two-step stroke and the holding member is withdrawn relative to the feed rod near the object, the feed rod holds the part at its end, and feeding and tightening of the part in the screw hole or bolt may be securely achieved.

In the invention the holding member makes a linear reciprocating movement to place the part in coaxial relationship with the feed rod, while alternatively the holding member makes a circular movement for the same purpose. The holding member itself is assigned with linear reciprocating movement or circular movement, so that the part is made coaxial with the feed rod smoothly and securely.

The invention provides an apparatus for feeding and tightening a threaded part comprising a rotatable feed rod having a socket hole at a front end thereof for receiving a part and being capable of reciprocating movement, a holding member for receiving and holding the part fed from a part feed passage, the holding member being movable between a first position remote from the feed rod and a second position in which the held part is coaxial with the feed rod, driving means for moving the holding member between the first position and second position, and restraining means for releasably restraining the part held by the holding member, wherein the part held by the holding member is moved from the first position to the second position in the restrained state.

In the invention the holding member possesses a groove for receiving the part, and the restraining means is in the form of a closure member for opening and closing the groove, so that the part may be restrained securely by the closure member.

In the invention the driving means causes the holding member to move linear between the first position and the second position.

Alternatively the driving member causes the holding member to turn between the first position and the second position.

The invention is characterized by a driving means for moving the holding member linear relative to the feed rod, and when the holding member is retracted by the driving means, relative to the feed rod, the feed rod only projects downward.

The invention is characterized by a means for applying a brake force on rotation to the part held by the holding member, so that the part may be inserted securely, without rotating together into the socket hold of the feed rod.

The invention provides an apparatus for feeding and tightening a threaded part comprising a rotatable feed rod having a socket hole at the front end thereof for receiving a part and being capable of reciprocating movement, a holding member for receiving and holding a part coming out of a part feed passage and being movable between a first position remote from the feed rod and a second position in which the held part is coaxial with the feed rod, driving means for moving the holding member between the first position and the second position, and means for applying a brake force on rotation to the part held by the holding means, wherein the part is engaged with the socket hole of the feed rod and then the feed rod moves forward until the part reaches and is tightened to an object. According to the invention, since the brake force on the rotation is acting on the part, when inserting the part into the socket hole of the rotating feed rod, the part is smoothly fitted into the socket hole in a short time without rotating together. The brake force for arresting the rotation of the part is applied by the action of a rod-shaped pushing member or by a magnetic attractive force on the part, such as a bolt received in the groove of the holding member or a nut put on the holding member.

The invention provides a method for feeding and tightening a threaded part comprising the steps of holding a part near a front end of a rotary arm, rotating the rotary arm to place the part on the axial line of a retractable feed rod, inserting the part into a socket hole of the feed rod, drawing back the rotary arm to its original position, and advancing the feed rod to transfer and tighten the part to an object. According to the invention, the part held by the rotary arm is handed on to the socket of the feed rod, and the feed rod is advanced while holding the part toward the object. Therefore, the relative position of the part and feed rod is not changed at all, and the part will not be deviated during the advance movement of the feed rod, so that accurate feed and tightening may be realized. Because of the rotary arm type, the arm behaviour range can be set inside, and the occupation space may be minimized.

In the invention the feed rod advances in two-step stroke, and the part is inserted into the feed rod in the first step, and the part is transferred and tightened to the object in the second step ensuring simple operation and reliable tightening.

In the invention at least the rotary arm and its rotary motor are retracted independently from the feed rod, which results in the feed rod projecting downward. Since the rotary arm and rotary motor are retracted independently from the feed rod, the feed rod is advanced in the projected state, facilitating the feeding and tightening of the part to an object located in a narrow position.

The invention provides an apparatus for feeding and tightening a threaded part comprising a rotary feed rod having a socket hole at a front end thereof for receiving a part and being capable of reciprocating movement, a rotary arm forming a part holding unit near a front end thereof, and a drive motor for turning the rotary arm between a first position for receiving and holding the part coming out of a part feed passage and a second position in which the held part and the feed rod are coaxial with each other, wherein the part is fitted into the socket hole of the feed rod by the motion of the rotary arm or feed rod.

DESCRIPTION OF THE PREFERRED EMBODIMENTS

Figure 1:
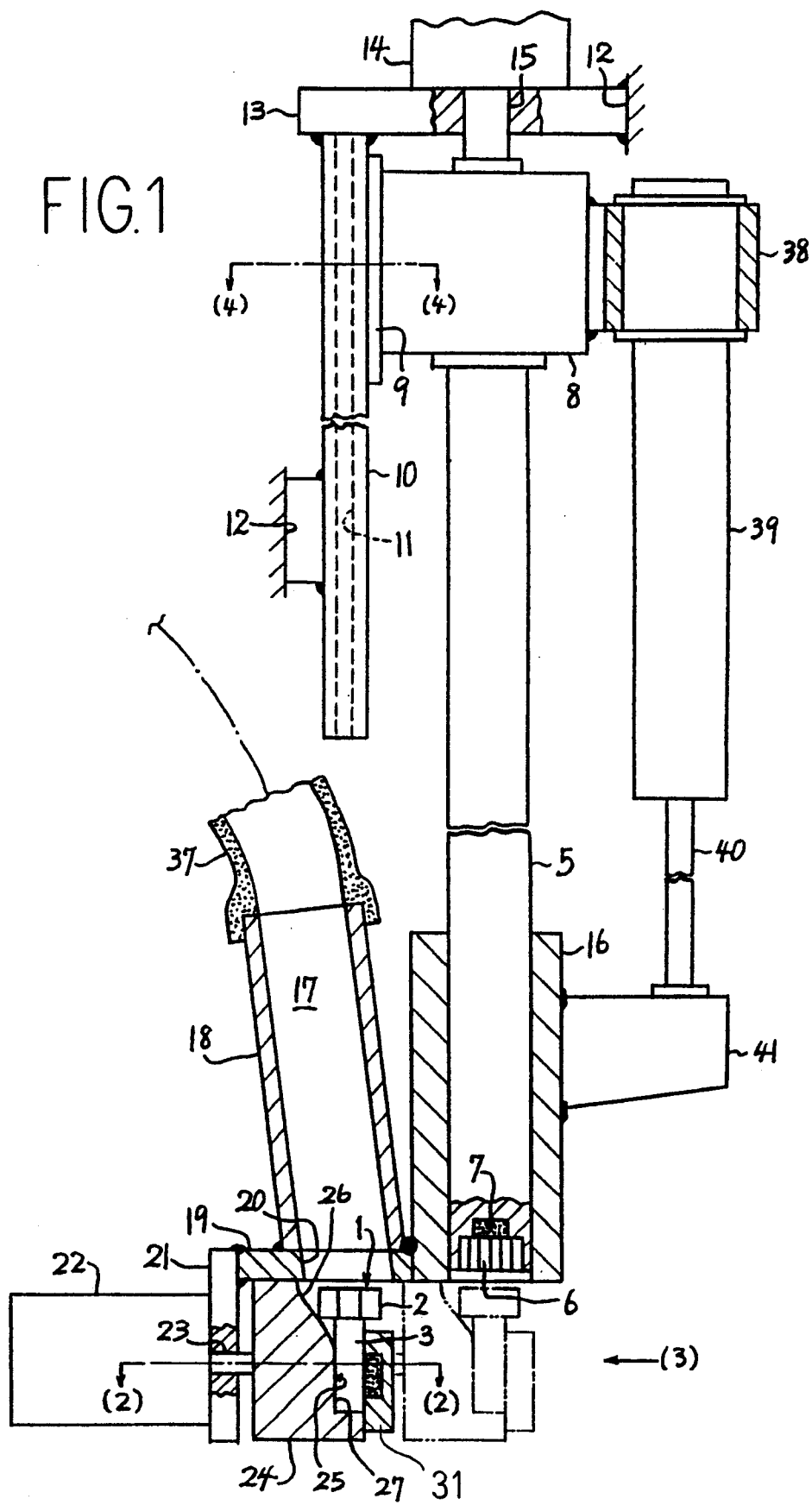
FIG. 1 is a side view in part in section of an apparatus embodying the invention.

Referring first to an embodiment shown in FIG. 1 through FIG. 4, the object part in this embodiment is a bolt 1, and numeral 2 denotes the hexagonal head, and 3 shows the shaft part. A feed rod 5 of rotatable retractable type has a socket hole 6 formed in its front end for receiving the head 2 end, and this socket hole 6 may advantageously have a dodexagonal or octagonal shape, rather than hexagonal shape, for smoothly receiving and engaging the hexagonal head. Deep inside the socket hole 6, a magnet (permanent magnet) 7 is embedded and by its attractive magnetic force, the head 2 is prevented from dropping off the socket hole 6.

The feed rod 5 is connected to a rotary motor 8 driven by compressed air, current or the like (air hose, electric wire and others are not shown), and a slide piece 9 fixed to the motor 8 moves back forth along a guide rail 10. As is clear from FIG. 4, a dovetail groove 11 is formed in the guide rail 10, and the slide piece 9 is slidably inserted therein. This guide rail 10 is welded to a fixing piece 13 attached to a stationary member 12, and extends along the direction in which the feed rod 5 makes reciprocating movements. An air cylinder is attached to the fixing piece 13, and its piston rod 15 is coupled with the rotary motor.

The feed rod 5 is slidably inserted in a guide tube 16, and a part feed pipe 18 having a part feed passage 17 is integrally assembled with the guide tube 16. They are shown as being welded together through a coupling 19 in this embodiment. The part feed pipe 18 is installed to form an acute angle to the axial line of the feed rod 5 as shown. Alternatively, it may be in parallel, instead of at an acute angle to the feed rod. The part feed pipe 18 is welded to the coupling plate 19, and the lower surface of the coupling plate is flush with the lower end of the guide tube 16 as shown in the drawing. A through hold 20 communicating with the part feed passage 17 is formed in the coupling plate 19.

Figure 2:
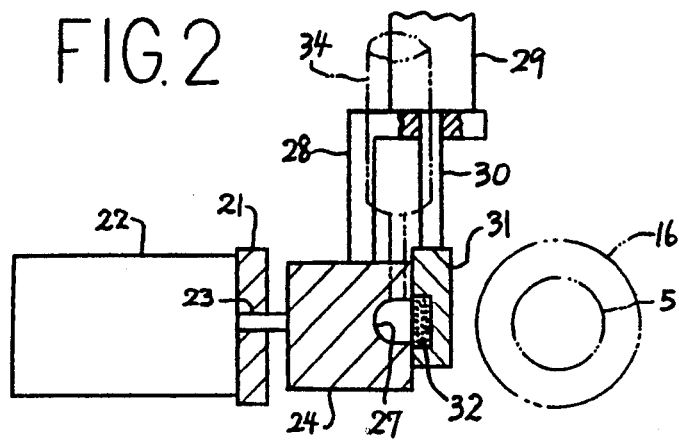
FIG. 2 is a sectional view taken along the line (2)—(2) in FIG. 1.

A fixing plate 21 is welded to the coupling plate 19, and an air cylinder 22 is attached thereto, and a holding member 24 is coupled with its piston rod 23. The holding member 24 is a nearly rectangular solid structure as shown in the drawing, and is designed to move back and forth while sliding on the lower surfaces of the coupling plate 19 and of the guide tube 16. A groove 25 for receiving the bolt 1 is formed in the surface of the holding member 24, opposite to the piston rod 23. This groove 25 is composed of a broad part 26 for receiving the head 2 and a narrow part 27 for receiving the shaft 3, and is in register with the through hole 20 when the holding member 24 is at the position as shown in FIG. 1. As shown in FIG. 2, an L-shaped bracket 28 is welded to the holding member 24, and a closure member 31 is fitted to a piston rod 30 of an air cylinder 29, fixed to the bracket so that the forward and backward motions of the piston rod 30, cause the closure member 31 to open and close the narrow part 27 of the groove 25. Inside the closure member 31, is embedded a magnet (permanent magnet) 32 for positioning the bolt 1 coming into the groove 25.

Figure 3:
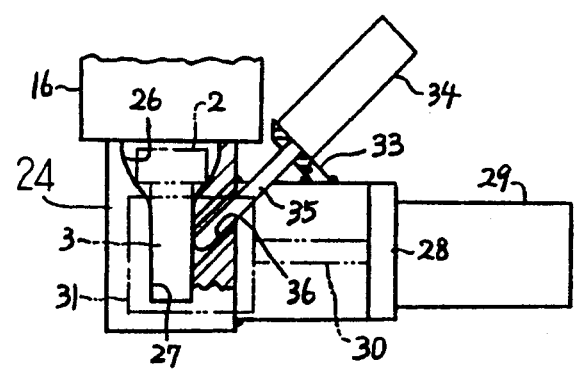
FIG. 3 is an arrow view (3) in FIG. 1.
Figure 4:
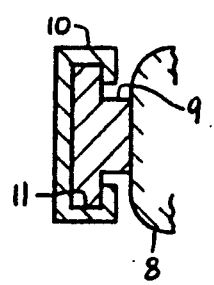
FIG. 4 is a sectional view taken along the line (4)—(4) in FIG. 1.

A variety of means for applying a brake force to the bolt 1, may be available, and an example of applying a pressing force to the shaft part 3 is shown here. That is, as shown in FIG. 3, a fixing piece 33 is welded to the bracket 28 in an oblique direction, and an air cylinder 34 is attached thereto, and its piston rod 35 extends through a hole 36 formed in an oblique direction in the holding member 24 thereby pressing the shaft part 3. In FIG. 2, for the ease of understanding, the air cylinder 34 and piston rod 35 are indicated by double dot chain line. A feed hose 37 of a flexible synthetic resin is connected to the parts feed pipe 18 (FIG. 1).

An air cylinder 39 as a driving means for reciprocating movements is firmly fixed through a bracket 38 to the rotary motor 8 and its piston rod 40 is coupled with an arm member 41 welded to the guide tube 16. As the piston rod 40 retracts, the guide tube 16 slides upward relative to the feed rod 5 which remains still so that the part feed pipe 18, holding member 24 and air cylinder 34 are raised in unison, resulting in the feed rod 5 projecting downward.

The sequence of the steps of the method according to this embodiment will now be described. In the initial state as shown in FIG. 1, the holding member 24 is in the position retracted to the left as shown while the closure member 31 is in the advanced position as shown. In such state, the bolt 1 is fed through the part feed pipe 18 and the shaft part 3 rushes into the narrow groove 27, so that the bolt is positioned as indicated by solid line in FIG. 1. When the shaft part 3 gets into the narrow groove 27, it is securely restrained and thus properly positioned by the closure member 31 and magnet 32. Then the holding member 24 is advanced to the right by the air cylinder 22, so that the head 2 comes just beneath the socket hole 6, that is, the bolt 1 is coaxial with the feed rod 5 as indicated by double dot chain line in FIG. 1. The piston rod 35 is pressed to the shaft part 3 when the bolt 1 is received in the holding member 24 or when the holding member 24 is advanced to the position as shown by double dot chain in FIG. 1, so that a brake force is applied to the bolt 1.

Subsequently, the air cylinder 14 is actuated to move the bolt 1 to the vicinity of a desired location, while the bolt 1 is restrained by the closure member 31, with the relative positions of the bolt 1 and feed rod 5 shown by double dot chain line in FIG. 1 remaining unchanged. Then the piston rod 40 of the air cylinder 39 is slightly withdrawn, so that the bolt 1 is moved toward the rotating feed rod 5, allowing the head 2 to be inserted into the socket hold 6 and attracted and held by the magnet 7. In this case, since the rotation of the bolt 1 is being arrested by the brake force which is due to both the piston rod 35 and magnet 32, it is smoothly fitted into the socket hole 6 without rotating together with the feed rod 5. Subsequently, the closure member 31 retreats, and the holding member 24 returns to the position indicated by solid line in FIG. 1, whereupon the piston rod 40 of the air cylinder 39 draws back, and only the feed rod 5 is projected. Later, the closure member 31 advances again so as to be ready for receiving the next bolt. By the advancement of the piston rod 15 of the air cylinder 14, the feed rod 5, holding member 24, air cylinders 22 and 39 advance in unison, thereby screwing the bolt 1 into the threaded hole at the desired location.

This series of actions as described may be easily carried out by the combination of the known electromagnetic air control valves and control circuits, for supply and discharge of working air to each air cylinder, and hence the explanation thereof is omitted herein. In the foregoing embodiments, the air hoses connected to the air cylinders are not shown for simplicity.

When the related members are moved together to the vicinity of the desired location by the output of the air cylinder 14, in the case previously described the holding member 24 is in the state indicated by single dot chain line in FIG. 1, but it may be also possible to move them with the holding member in the state indicated by the solid line.

Figure 5:
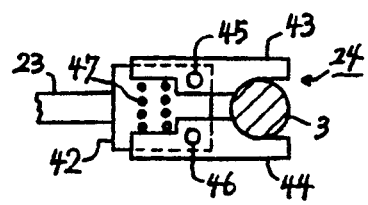
FIG. 5 is a plan view of holding member in a chuck form.

In FIG. 5, the entire holding member 24 is in the form of a chuck mechanism in which a pair of jaws 43, 44 are pivotally mounted on a base plate 42 affixed to the front end of the piston rod 23, via pins 45, 46 and are adapted to grasp the shaft part 3 of the bolt between the opposing ends thereof. Between the rear ends of the jaws 43, 44, a coil spring 47 is disposed so as to grip the shaft part 3 by applying a brake force thereto.

Figure 6:
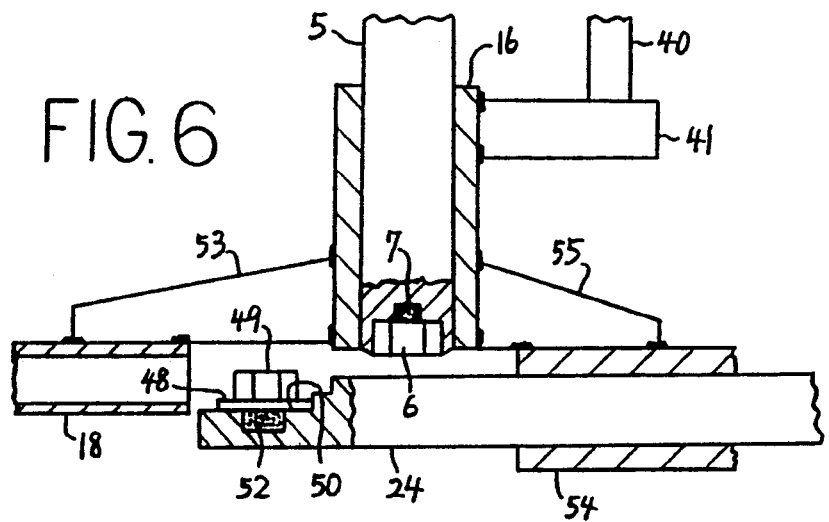
FIG. 6 is a longitudinal sectional view showing another embodiment of the invention.
Figure 7:
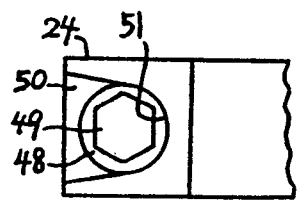
FIG. 7 is a plan view of a holding member in FIG. 6.

Referring now to the embodiment shown in FIG. 6 and FIG. 7, the part in question here is a nut 49 having a flange 48, in which the part feed pipe 18 is installed nearly in the horizontal direction, and the nut 49 is transferred from the end of the pipe 18 to the holding member 24 waiting in near abutment. A recess 50 is formed in the upper surface of the front end of the holding member 24 for receiving the flange 48, its peripheral wall containing an arc 51 (see FIG. 7) for positioning the circular flange 48. A magnet (permanent magnet) 52 is embedded in the recess 50. The nut 49 is attracted to the magnet 52 and receives the restraining action as mentioned above in relation to the magnet 32. As a result, a resistance to sliding in the rotating direction, or the brake force as mentioned above is exerted. The part feed pipe 18 is welded to the guide tube 16 through a bracket 53, and the holding member 24 is slidably inserted in a guide pipe 54, which in turn is welded to the guidetube 16 through a bracket 55. The remainder of the structure and its operation are similar to those as in the FIG. 1 embodiment and detailed description thereof is omitted.

In the embodiment in FIG. 1, as described in detail above, the holding member 24, together with the closure member 31 is advanced close to the desired location in unison with the feed rod 5 without varying the relative position of the former with respect to the latter and later the holding member 24 is moved in the axial direction of the feed rod 5, allowing the head 2 to be fitted into the socket hole 6, then the holding member 24 is further raised until the feed rod 5 is relatively projected. Alternatively, after the holding member and the feed rod are advanced in unison to the vicinity of the desired location, only the feed rod 5 may work in two-step stroke. A practical example thereof will be described with reference to FIG. 1 with some modification. In short, coupling of the rotary motor 8 and air cylinder 39 is abolished, and the air cylinder 39 is fitted to the stationary member. When the holding member 24 and the feed rod advance together without varying their relative position, the piston rod 40 of the air cylinder 39 is also extended in harmony with the operation of the air cylinder 14, and the feed rod 5 is advanced in two-step stroke by the air cylinder 14. In the first step stroke, the head part 2 is fitted into the socket hole 6, and then the closure member 31 retreats, and the holding member 24 returns to the left, then the feed rod 5 advances in the second step stroke, thereby feeding and tightening the bolt into the desired location.

Figure 8:
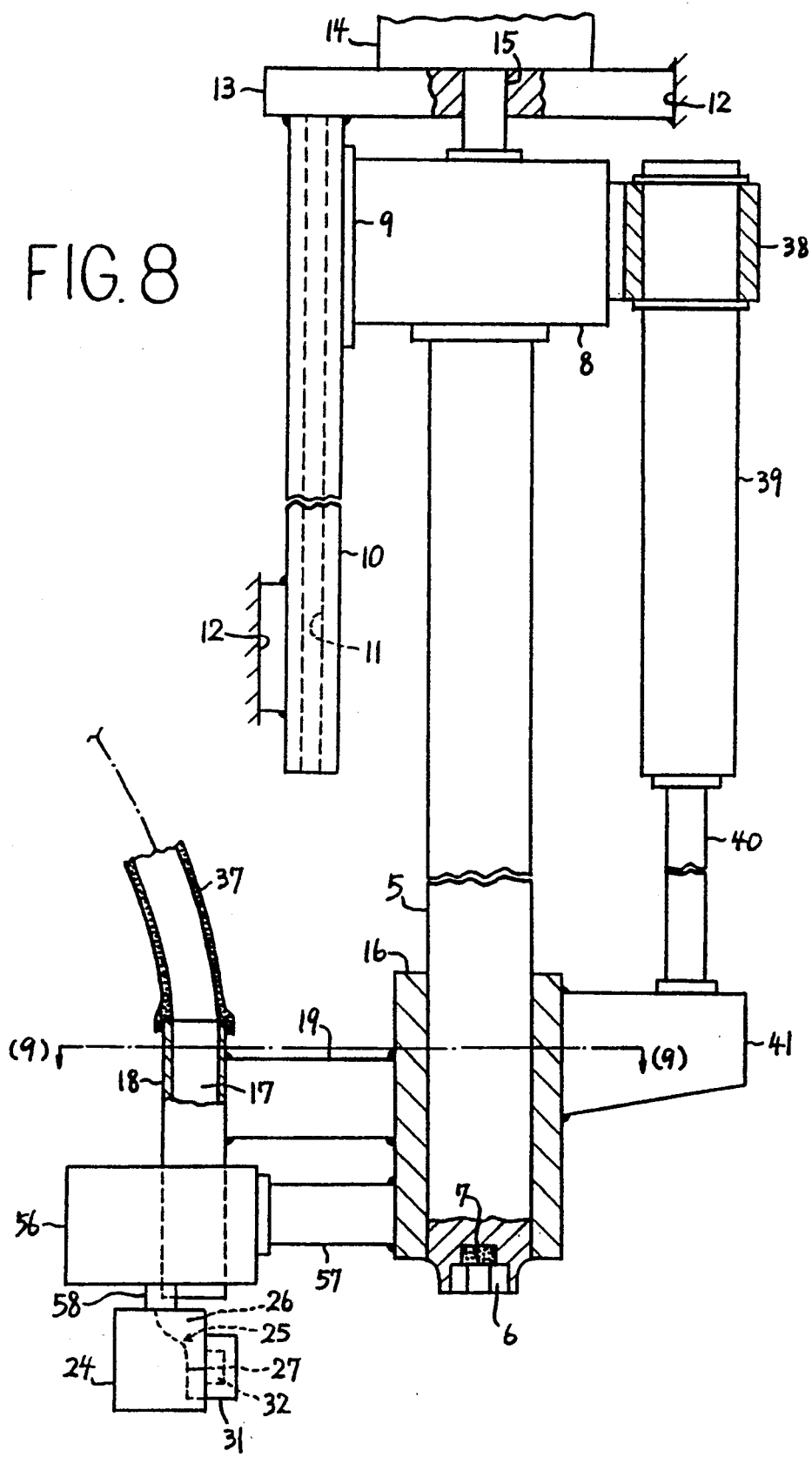
FIG. 8 is a side view in part in section of a further embodiment.
Figure 9:
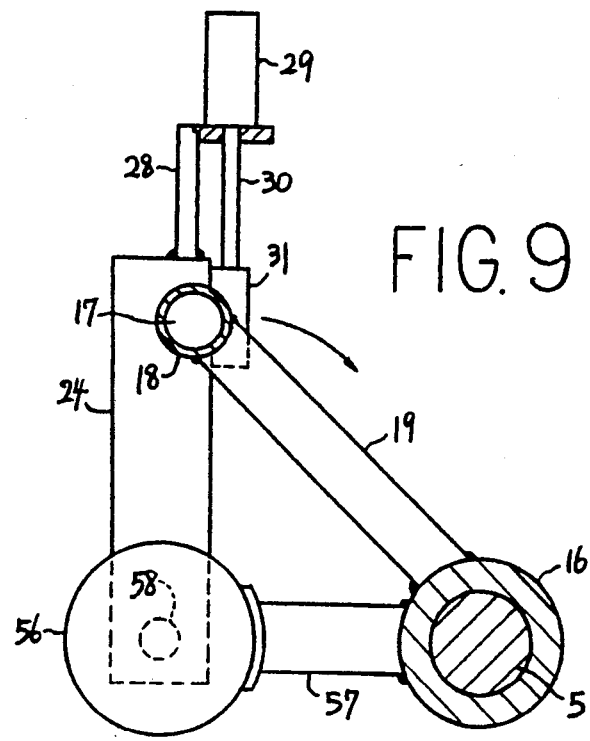
FIG. 9 is a sectional view taken along the line (9)—(9) in FIG. 8.

Though in the foregoing embodiments, the holding member 24 moves in a line back and forth, an embodiment where the holding member makes circular motion is shown in FIG. 8 and FIG. 9. The members function the same as in the preceding embodiments and are identified with the same reference numerals and detailed description thereof is omitted. In this case, at least a rotary arm 24 corresponding to the holding member and rotary motor 56 withdraw independently from the feed rod 5, so that the head part of the bolt (not shown) is fitted into the socket hole 6. The rotary motor 56 may be of any of the conventional type, such as motor-driven, pneumatic and the like. The rotary motor 56 is fixed to the guide tube 16 through a bracket 57, and the rotary arm 24 is fitted to an output shaft 58, and the groove 25, L-shaped bracket 28, air cylinder 29 and closure member 31 are disposed at the front end part of the rotary arm 24.

The guide member 16 is allowed to slide back and forth along the feed rod 5. The air cylinder 39 is attached to the rotary motor 8 through the bracket 38, and the piston rod 40 is coupled to the bracket 41. The bracket 19 is longer than the one used in the preceding embodiments, and one end thereof is welded to the guide tube 16.

The operation of this embodiment will now be described. When the bolt (not shown) is held in the part holding unit and the rotary arm 24 rotates until the bolt becomes coaxial with the feed rod 5, the head part of the bolt is fitted into the socket hole 6 by the very slight upward stroke of the first step of the air cylinder 39. In succession, the closure member 31 retreats and the rotary arm 24 retreats, and the air cylinder 39 makes an upward stroke of the second step, so that only the feed rod 5 is projected downward from the guide tube 16. From this state, this time, the air cylinder 14 is actuated to carry and tighten the bolt to the desired location. When the air cylinder 14 is actuated, not only the feed rod 5 but also the guide tube 16, rotary motor 56, rotary arm 24, part feed pipe 18, and air cylinder 39 advance in unison without varying their relative position with respect to the feed rod 5. When tightening of the bolt is over, the air cylinder 14 retracts, and the air cylinder 39 advances, thereby coming to the state of waiting for the next bolt as shown in FIG. 8.

In this embodiment, the part feed pipe 18 is shown as being coupled with the guide tube 16, but alternatively, the part feed pipe 18 may be fitted to the stationery member. That is, at least the rotary aim and the rotary motor are designed to retreat, independently from the feed rod.

Figure 10:
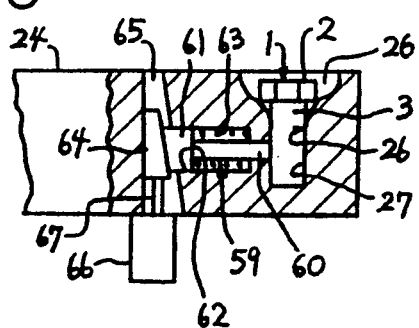
FIG. 10 is a longitudinal sectional view showing the mechanism for applying a brake force.

In this embodiment, the bolt 1 should not rotate together with the feed rod when the head part 2 is being inserted into the socket hold 6, and therefore, it is desired that a brake force should be applied to the bolt 1 in position in the holding member 24. The arrangement for this purpose is shown in FIG. 10, in which a pushing pin 59 is abutted against the shaft part 3. The pushing pin 59 is composed of a small diameter end 60 and a large diameter end 61, and is accommodated in a guide hole 62. The resilient force of the coil spring 63 is applied to the large diameter end 61, which is thereby pressed against a cam piece 64. The cam piece 64 is put in the guide hole 65 in the rotary arm 24, and is connected to a piston rod 67 of an air cylinder 66 fixed to the rotary arm 24. When the cam piece 64 is pushed up by the air cylinder 66, the pushing pin 59 is pressed to the shaft part 3 to apply a brake force thereto. When the head part 2 of the bolt 1 is firmly fitted and engaged in the socket hole 6 of the rotating feed rod 5, the bolt 1 overcomes the brake force exerted by the pushing pin 59 to rotate together with the feed rod.

Figure 11:
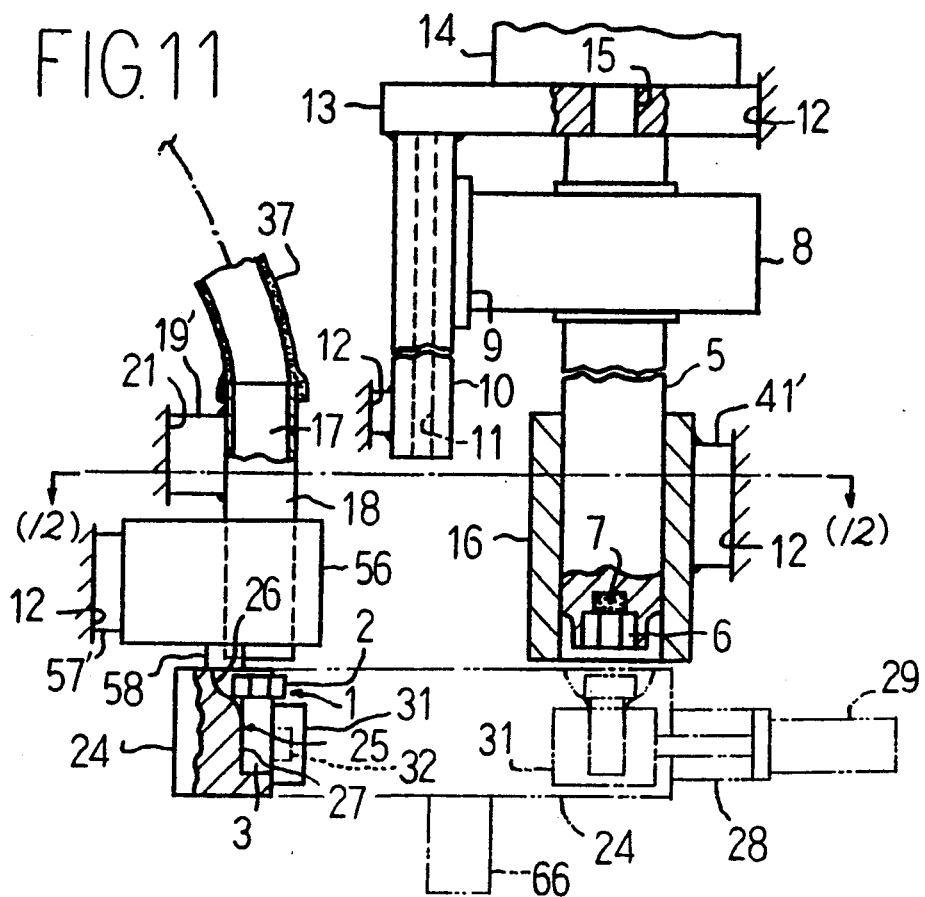
FIG. 11 is a side view in part in section of a still further embodiment of the invention.
Figure 12:
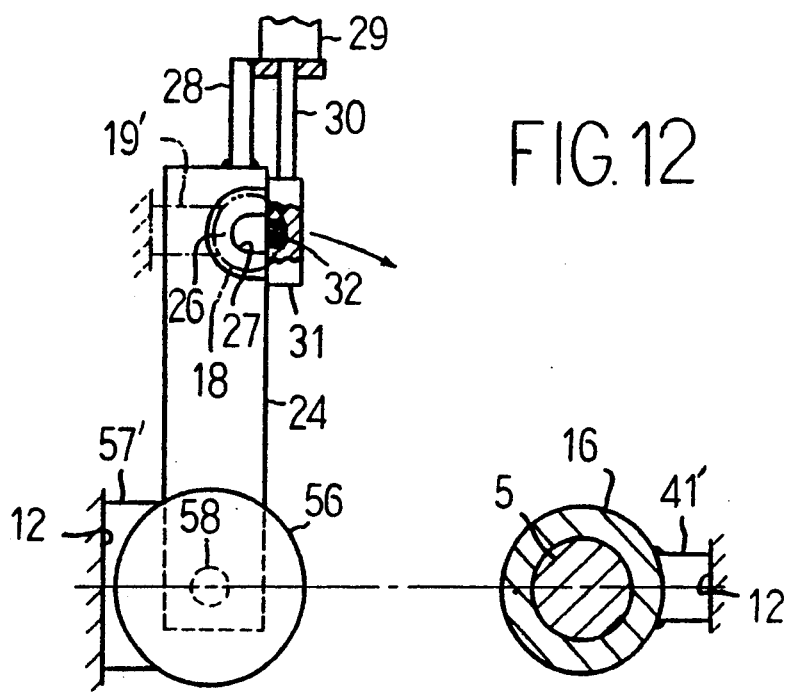
FIG. 12 is a sectional view taken along the line (12)—(12) in FIG. 11.

In the embodiment shown in FIG. 11 and FIG. 12, the guide tube 16 is fixed to the stationary member 12 through a bracket 41' the feed rod 5 being slidably and rotatable inserted into the guide tube 16. The part feed pipe possessing the part feed passage 17 is firmly fixed to the stationary member 12 through a bracket 19', and a feed hose 37 extending from the parts feeder (not shown) is connected to the part feed pipe 18. The air-driven or electric-driven rotary motor 56 is also fixed to the stationary member 12 through the bracket 57', and the rotary arm 24 is coupled to its output shaft 58, and the part holding unit is formed near its front end. Various forms of the part holding unit may be adopted, and a groove 25 for receiving the bolt 1 is shown by way of example, which consists of a wide part 26 for receiving the head part 2 and a narrow part 27 for receiving the shaft part 3. When the rotary arm 24 is in the return position (FIG. 12), the part holding unit is immediately beneath the feed pipe 18, with the arrangement being such that the bolt 1 coming out of the part feed pipe 18 may smoothly get into the groove 25. The L-shaped bracket 28 is welded to the front end of the rotary arm 24, and the closure member 31 is fitted to the piston rod 30 of the air cylinder 29 fixed thereto so that the retracting and advancing motion of the piston rod 30 of the air cylinder 29 causes the closure member 31 to open and close the narrow part 27 of the groove 25. Meanwhile, a magnet (permanent magnet) is embedded in the closure member 31, for positioning the incoming bolt 1.

The relative positions of the output shaft 58 and feed rod 5 are set so that the bolt 1 is positioned on the axial line of the feed rod 5 as indicated by double dot chain line in FIG. 11. When the rotary arm 24 rotates in the direction of arrow (FIG. 12) by a specific angle (90° in the shown embodiment).

Explaining the sequence of operation in this embodiment, the bolt 1 is fed to the narrow part 27, closed by the closure member 31 and is received and stopped in the groove 25 as shown in FIG. 11. Next, the rotary arm 24 rotates by a specific angle until the bolt 1 is on the axial line of the feed rod 5, then the feed rod 5 rotates and makes a slight advancing stroke of the first step by means of the air cylinder 29, so that the bolt head part 2 is fitted into the socket hole 6 and is held by the magnet 7. Afterwards, the closure member 31 retreats, and the rotary arm 24 retreats to the original position, then the feed rod 5 makes the second step stroke, whereby the bolt 1 reaches the threaded hole (not shown) at the desired location and is driven therein. When this operation is complete, the feed rod 5 returns to the position in FIG. 1 to be ready for the next stroke.

In the embodiments explained herein, the rotary motor with the rotating output shaft is shown, but alternatively, a pivot may be affixed to the rotary arm, a lever arm fitted to the pivot and the air cylinder coupled with the arm. The control device for obtaining the sequence of operation as mentioned herein may be easily realized by the combination of the conventional electromagnetic air control valves and control circuits. The feed hose is flexible and has an extra length so as to be deflected in operation.

What is claimed is:

1. An apparatus for feeding and fastening a threaded part comprising:
   a rotatable feed rod having a socket hole at a front end thereof for receiving a ferromagnetic part;
   a holding member having a groove for receiving and holding the part fed from a part feed passage, the holding member being movable between a first position remote from the feed rod and a second position in which the held part is coaxial with the feed rod;
   driving means for moving the holding member between the first and second positions; and
   a reciprocating plate for selectively closing the groove thereby releasably restraining the part held by the holding member, the plate having a magnet embedded therein for fixing the position of the part against the plate when the part is received in the groove.

2. An apparatus for feeding and fastening a threaded part according to claim 1, wherein the driving means causes the holding member to move linearly between the first position and the second position.

3. An apparatus for feeding and fastening a threaded part according to claim 1, wherein the driving member causes the holding member to rotate between the first and second positions.

4. An apparatus for feeding and fastening a threaded part according to claim 1, further comprising selectively actuated means located adjacent the groove for alternatingly clamping and releasing the held part in the groove.

5. An apparatus for feeding and fastening a threaded part comprising:
   a rotatable feed rod having a socket hole at a front end thereof for receiving a part;
   a holding member having a groove for receiving and holding the part fed from a part feed passage, the holding member being movable between a first position remote from the feed rod and a second position in which the held part is coaxial with the feed rod;
   driving means for moving the holding member between the first and second positions;
   a reciprocating member for selectively closing the groove thereby releasably restraining the part held by the holding member; and
   selectively actuated means located adjacent the groove for alternatingly clamping and releasing a held ferromagnetic part in the groove.

6. An apparatus for feeding and fastening a threaded part according to claim 5, wherein the driving means causes the holding member to move linearly between the first position and the second position.

7. An apparatus for feeding and fastening a threaded part according to claim 5, wherein the driving member causes the holding member to rotate between the first and second positions.

* * * * *